United States Patent
Gontani et al.

(10) Patent No.: US 11,649,370 B2
(45) Date of Patent: May 16, 2023

(54) THERMOSETTING COATING COMPOSITION

(71) Applicant: KANSAI PAINT CO., LTD., Amagasaki (JP)

(72) Inventors: Haruyuki Gontani, Kanagawa (JP); Fumio Yamashita, Kanagawa (JP); Takashi Iwai, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 902 days.

(21) Appl. No.: 16/463,681

(22) PCT Filed: Sep. 27, 2017

(86) PCT No.: PCT/JP2017/034974
§ 371 (c)(1),
(2) Date: May 24, 2019

(87) PCT Pub. No.: WO2018/096780
PCT Pub. Date: May 31, 2018

(65) Prior Publication Data
US 2019/0276702 A1    Sep. 12, 2019

(30) Foreign Application Priority Data
Nov. 24, 2016 (JP) ............... JP2016-228374

(51) Int. Cl.
| | | |
|---|---|---|
| *C09D 175/04* | (2006.01) | |
| *C09D 201/06* | (2006.01) | |
| *C08G 18/65* | (2006.01) | |
| *C08G 18/73* | (2006.01) | |
| *C08G 18/67* | (2006.01) | |
| *C08G 18/80* | (2006.01) | |
| *C08G 18/18* | (2006.01) | |
| *C08G 18/64* | (2006.01) | |
| *C08K 5/31* | (2006.01) | |
| *C08K 5/36* | (2006.01) | |

(52) U.S. Cl.
CPC ....... *C09D 175/04* (2013.01); *C08G 18/1858* (2013.01); *C08G 18/6407* (2013.01); *C08G 18/65* (2013.01); *C08G 18/672* (2013.01); *C08G 18/73* (2013.01); *C08G 18/8077* (2013.01); *C09D 201/06* (2013.01); *C08G 18/80* (2013.01); *C08K 5/31* (2013.01); *C08K 5/36* (2013.01)

(58) Field of Classification Search
CPC .... C09D 175/04; C09D 201/06; C08G 18/65; C08G 18/80; C08G 18/1858; C08G 18/6407; C08G 18/73; C08G 18/8077; C08G 18/672; C08K 5/31; C08K 5/36
See application file for complete search history.

(56) References Cited

U.S. PATENT DOCUMENTS

| | | | |
|---|---|---|---|
| 4,328,330 A | 5/1982 | Wellner et al. | |
| 5,064,896 A | 11/1991 | Martin | |
| 5,981,652 A | 11/1999 | Kawazu et al. | |
| 6,015,860 A | 1/2000 | Kuzumaki et al. | |
| 6,479,103 B1 | 11/2002 | Wichelhaus et al. | |
| 8,912,113 B2 | 12/2014 | Ravichandran et al. | |
| 2006/0247341 A1 | 11/2006 | Hsieh et al. | |
| 2011/0015304 A1* | 1/2011 | Gaud .................. | B01J 31/0251 525/450 |
| 2011/0135935 A1 | 6/2011 | Adachi et al. | |
| 2011/0229645 A1 | 9/2011 | Shaffer et al. | |
| 2012/0164336 A1 | 6/2012 | Maliverney | |
| 2012/0172471 A1 | 7/2012 | Maliverney | |
| 2014/0308451 A1 | 10/2014 | Westhoff et al. | |
| 2014/0364537 A1 | 12/2014 | Li et al. | |
| 2015/0210886 A1* | 7/2015 | Hoffmann .......... | C08G 18/6254 427/407.1 |
| 2016/0017176 A1 | 1/2016 | Wonnemann | |
| 2016/0200858 A1 | 7/2016 | Fukuda et al. | |
| 2019/0315910 A1 | 10/2019 | Fukuda et al. | |

FOREIGN PATENT DOCUMENTS

| | | |
|---|---|---|
| CN | 101845216 A | 9/2010 |
| CN | 102046708 A | 5/2011 |
| CN | 102159332 A | 8/2011 |
| CN | 102575011 A | 7/2012 |
| CN | 102803414 A | 11/2012 |
| CN | 102918127 A | 2/2013 |
| CN | 103339165 A | 10/2013 |
| CN | 103998480 A | 8/2014 |
| CN | 104136137 A | 11/2014 |
| EP | 0905163 A1 | 3/1999 |
| JP | 3-2288 A | 1/1991 |

(Continued)

OTHER PUBLICATIONS

Communication dated Jul. 2, 2020 issued by the European Intellectual Property Office in counterpart European Application No. 17873026.3.

(Continued)

*Primary Examiner* — Rabon A Sergent
(74) *Attorney, Agent, or Firm* — Sughrue Mion, PLLC

(57) ABSTRACT

A thermosetting coating composition includes a hydroxyl group-containing resin (A), a blocked polyisocyanate curing agent (B), and an amine compound (C) represented by the formula (1). In the formula (1), $R^1$ to $R^5$ each independently represents a hydrogen atom or an organic group having one or more carbon atoms. The organic group may contain one or more atoms selected from the group consisting of oxygen atoms, nitrogen atoms, sulfur atoms, and halogen atoms.

(1)

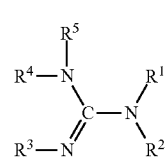

10 Claims, No Drawings

(56) References Cited

FOREIGN PATENT DOCUMENTS

| JP | 6-501274 A | 2/1994 |
| JP | 10-101996 A | 4/1998 |
| JP | 11-255997 A | 9/1999 |
| JP | 2000-290542 A | 10/2000 |
| JP | 2001-522923 A | 11/2001 |
| JP | 2011-515553 A | 5/2011 |
| JP | 2012-152725 A | 8/2012 |
| JP | 2012-530174 A | 11/2012 |
| JP | 2012-530176 A | 11/2012 |
| JP | 2013-522444 A | 6/2013 |
| JP | 2014-514381 A | 6/2014 |
| JP | 2015-108049 A | 6/2015 |
| JP | 2016-138202 A | 8/2016 |
| WO | 2015/025776 A1 | 2/2015 |

OTHER PUBLICATIONS

Communication dated Jul. 10, 2020 issued by the Indian Patent Office in Indian counterpart Application No. 201917020510.
Office Action dated Mar. 16, 2021, issued by the Japan Patent Office in counterpart Japanese Patent Application No. 2018-212986.
Search Report dated Jan. 9, 2018, issued by the International Searching Authority in International Application No. PCT/JP2017/034974 (PCT/ISA/210).
Written Opinion dated Jan. 9, 2018, issued by the International Searching Authority in International Application No. PCT/JP2017/034974 (PCT/ISA/237).
Communication dated Nov. 24, 2020, from the State Intellectual Property Office of People's Republic of China in counterpart Application No. 201780072130.8.
Haijun Zhao et al. "Study on Blocked Isocyanates" Chemistry and Adhesion, vol. 37, No. 4, 2015 (13 pages total).

* cited by examiner

THERMOSETTING COATING COMPOSITION

TECHNICAL FIELD

The present invention relates to a thermosetting coating composition excellent in coating curability and coating appearance despite containing substantially no metal catalyst, and a coated article obtained by applying the coating composition.

BACKGROUND ART

An isocyanate curing agent is generally used as a curing agent for a coating composition. However, the isocyanate curing agent is hardly used for a one-pack coating composition, which is obtained by mixing a resin having active hydrogen with a polyisocyanate curing agent in advance, since a reaction between an isocyanate group and active hydrogen proceeds even at room temperature. Therefore, a method using a blocked isocyanate that has been inactivated at room temperature by allowing polyisocyanate to react with an active hydrogen group-containing compound (blocking agent) has been put to practical use.

The blocked isocyanate does not react with a resin at room temperature. However, when the blocked isocyanate is heated, the blocking agent is dissociated to regenerate an isocyanate group, and a crosslinking reaction between the isocyanate group and the resin having active hydrogen proceeds. Therefore, usable time is not limited, and a one-pack coating composition can be obtained. Further, the blocked isocyanate may also be applied to an aqueous coating composition using water or alcohol having active hydrogen is used as a medium.

Compounds such as phenol-based blocking agent, caprolactam-based blocking agent, oxime-based blocking agent, active methylene-based blocking agent and pyrazole-based blocking agent are common as a blocking agent used for the above-mentioned blocked isocyanate. In addition, organotin compounds such as dibutyltin dibenzoate, dioctyltin oxide, and dibutyltin oxide have been generally used as a dissociation catalyst for the blocking agent (Patent Literature 1).

However, a catalyst other than the organotin compounds has been required since toxicity of the organotin compounds has become an issue in recent years though catalytic performance thereof is high. A bismuth-based or zinc-based catalyst has been developed as a substitute article of the organotin compounds (Patent Literatures 2 and 3).

CITATION LIST

Patent Literature

PTL 1: JP-A-H10-101996
PTL 2: JP-A-2000-290542
PTL 3: JP-A-2012-152725

SUMMARY OF INVENTION

Technical Problem

Thermosetting coating compositions in the related art all contain a metal catalyst, which causes environmental problems. In addition, there arises a problem that bismuth-based catalysts and zinc-based catalysts are expensive, have insufficient catalytic effects, and are unstable in coating compositions.

An object of the invention is to provide a blocked isocyanate-based thermosetting coating composition having effectiveness as a catalyst and coating stability without using a metal catalyst.

Solution to Problem

As a result of inventive studies for solving the above problem(s), the present inventors found that the above problem(s) could be solved by using a thermosetting coating composition containing the specific amine compound, a hydroxyl group-containing compound and a blocked polyisocyanate curing agent, and then, the present invention has been accomplished. That is, the present invention provides the following thermosetting coating composition and coated article obtained by applying the thermosetting coating composition.

[1] A thermosetting coating composition, comprising a hydroxyl group-containing resin (A), a blocked polyisocyanate curing agent (B), and an amine compound (C) represented by the following formula (1):

[Chem. 1]

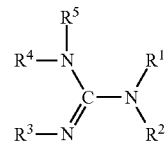

(1)

wherein $R^1$ to $R^5$ each independently represents a hydrogen atom or an organic group having one or more carbon atoms, and the organic group may contain one or more atoms selected from the group consisting of oxygen atoms, nitrogen atoms, sulfur atoms, and halogen atoms.

[2] The thermosetting coating composition according to [1], wherein the amine compound (C) is an amine compound represented by the following formula (2):

[Chem. 2]

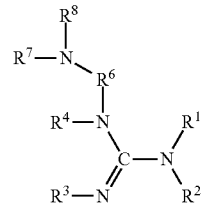

(2)

wherein $R^1$ to $R^4$ and $R^7$ and $R^8$ each independently represents a hydrogen atom or an organic group having one or more carbon atoms, and the organic group may contain one or more atoms selected from the group consisting of oxygen atoms, nitrogen atoms, sulfur atoms and halogen atoms; and $R^6$ is a bifunctional organic group having one or more carbon atoms, and the organic group may contain one or more atoms selected from the group consisting of oxygen atoms, nitrogen atoms, sulfur atoms and halogen atoms.

[3] The thermosetting coating composition according to [1] or [2], wherein the amine compound (C) is an amine compound represented by the following formula (3):

[Chem. 3]

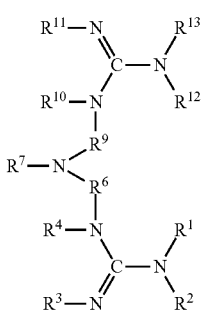
(3)

wherein $R^1$ to $R^4$, $R^7$, and $R^{10}$ to $R^{13}$ each independently represents a hydrogen atom or an organic group having one or more carbon atoms, and the organic group may contain one or more atoms selected from the group consisting of oxygen atoms, nitrogen atoms, sulfur atoms and halogen atoms; and $R^6$ and $R^9$ each independently represents a bifunctional organic group having one or more carbon atoms, and the organic group may contain one or more atoms selected from the group consisting of oxygen atoms, nitrogen atoms, sulfur atoms and halogen atoms.

[4] The thermosetting coating composition according to any one of [1] to [3], wherein in the amine compounds (C) represented by the above formulas (1) to (3), at least one of $R^1$ to $R^5$, $R^7$, $R^8$, and $R^{10}$ to $R^{13}$ independently represents a hydrocarbon group having three or more carbon atoms.

[5] The thermosetting coating composition according to [4], wherein the hydrocarbon group having three or more carbon atoms is a branched or cyclic hydrocarbon group.

[6] The thermosetting coating composition according to any one of [1] to [5], wherein the amine compound (C) is an amine compound represented by the following formula (4):

[Chem. 4]

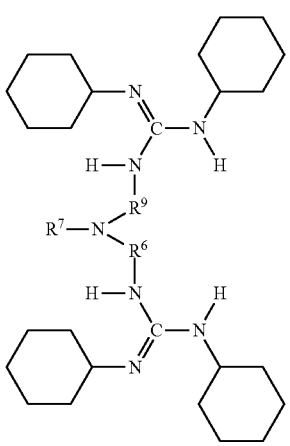
(4)

wherein $R^7$ represents a hydrogen atom or an organic group having one or more carbon atoms, and the organic group may contain one or more atoms selected from the group consisting of oxygen atoms, nitrogen atoms, sulfur atoms and halogen atoms; and $R^6$ and $R^9$ each independently represents a bifunctional organic group having one or more carbon atoms, and the organic group may contain one or more atoms selected from the group consisting of oxygen atoms, nitrogen atoms, sulfur atoms and halogen atoms.

[7] The thermosetting coating composition according to any one of [1] to [5], wherein in the amine compounds (C) represented by the above formulas (1) to (3), at least one of $R^3$ and $R^{11}$ represents a structure represented by the following formula (5):

[Chem. 5]

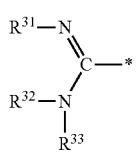
(5)

wherein $R^{11}$ to $R^{33}$ each independently represents a hydrogen atom or an organic group having one or more carbon atoms, and the organic group may contain one or more atoms selected from the group consisting of oxygen atoms, nitrogen atoms, sulfur atoms and halogen atoms; and * represents an atomic bonding.

[8] The thermosetting coating composition according to any one of [1] to [7], wherein in the amine compounds (C) represented by the above formulas (1) to (4), at least one of $R^1$ to $R^{13}$ has a number average molecular weight of 300 or more.

[9] The thermosetting coating composition according to any one of [2], [3], and [6], wherein in the amine compounds (C) represented by the above formulas (2), (3), and (4), $R^7$ has a number average molecular weight of 300 or more.

[10] The thermosetting coating composition according to [1], wherein the amine compound (C) has a structure represented by at least one of the following formulas (6) and (7):

[Chem. 6]

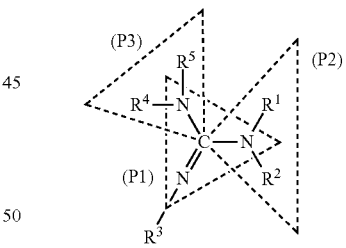
(6)

wherein $R^1$ to $R^5$ each independently represent a hydrogen atom or an organic group having one or more carbon atoms, and the organic group may contain one or more atoms selected from the group consisting of oxygen atoms, nitrogen atoms, sulfur atoms, and halogen atoms;

wherein in the formula (6), an average dihedral angle α shown in the following equation (A) obtained by a structural optimization calculation based on a density functional theory calculation B3LYP/6-31G* is 20° or less, wherein in a case where the amine compound has two or more kinds of the above structures in a molecular thereof, the smaller value is set as the dihedral angle:

Dihedral Angle α=[(dihedral angle between $P1$ and $P2$)+(dihedral angle between $P1$ and $P3$)]/2 (A)

wherein P1 is a plane containing three N atoms, P2 is a plane containing C(R$^1$) (R$^2$), and P3 is a plane containing C(R$^4$)(R$^5$),

[Chem. 7]

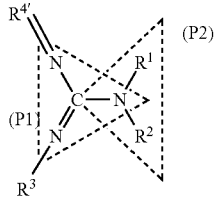

(7)

wherein R$^1$ to R$^3$ and R$^4$ each independently represents a hydrogen atom or an organic group having one or more carbon atoms, and the organic group may contain one or more atoms selected from the group consisting of oxygen atoms, nitrogen atoms, sulfur atoms, and halogen atoms;

wherein in the formula (7), a dihedral angle α shown in the following equation (B) obtained by the structural optimization calculation based on the density functional theory calculation B3LYP/6-31G * is 20° or less, wherein in a case where the amine compound has two or more kinds of the above structures in a molecular thereof, the smaller value is set as the dihedral angle:

Dihedral Angle α=dihedral angle between P1 and P2    (B)

wherein P1 is a plane containing three N atoms, and P2 is a plane containing C(R$^1$)(R$^2$).

[11] A coated article obtained by applying the thermosetting coating composition according to any one of [1] to [10] to an object to be coated.

Advantageous Effects of Invention

The thermosetting coating composition of the present invention maintains good coating stability and has good coating curability without using a metal catalyst. In addition, in the thermosetting coating composition of the present invention, it is possible to form a coating film that has a good finishing property, and is excellent in chemical resistance, weather resistance, corrosion resistance, water resistance, and the like.

DESCRIPTION OF EMBODIMENTS

The present invention relates to a thermosetting coating composition that contains a hydroxyl group-containing resin, a blocked polyisocyanate curing agent, and a specific amine compound.

The details are described below.

In the present description, all percentages and parts in mass are same as percentages and parts in weight.

Hydroxyl group-containing resin (A) As the hydroxyl group-containing resin (A) that can be used in the thermosetting coating composition of the present invention, any common resin can be used without particular limitation as long as the resin has a hydroxyl group and can be crosslinked with the blocked polyisocyanate curing agent (B).

As reactive functional groups other than the hydroxyl group, which can be crosslinked with the blocked polyisocyanate curing agent, examples thereof include an epoxy group, a carboxylic anhydride group, and a reactive functional group having active hydrogen such as an amino group, a carboxyl group, and an active methylene group. These reactive functional groups may be used in combination with the hydroxyl group.

Examples of the hydroxyl group-containing resin (A) include an acrylic resin, a polyester resin, an epoxy resin, an alkyd resin, a polyether resin, a polyurethane resin, and a polyamide resin. These resins may be used alone or in combination of two or more thereof. In particular, it is preferable that the hydroxyl group-containing resin (A) is at least one selected from an acrylic resin (A1), a polyester resin (A2), and an epoxy resin (A3).

The hydroxyl group-containing resin (A) may be in a state of being dissolved in the thermosetting coating composition, or may be in a state of being dispersed in the thermosetting coating composition (for example, a state of being emulsified in an aqueous solvent). In addition, the hydroxyl group-containing resin (A) in the dispersed state may be crosslinked resin particles.

Acrylic Resin (A1)

The acrylic resin (A1) that can be used in the thermosetting coating composition of the present invention can be produced by radical copolymerization of acrylic monomers.

Examples of the acrylic monomers include a hydroxyl group-containing acrylic monomer such as 2-hydroxyethyl (meth)acrylate, 2-hydroxypropyl (meth)acrylate, 4-hydroxybutyl (meth)acrylate, and an addition product of 2-hydroxyethyl (meth)acrylate with caprolactone (e.g., trade name Placcel FA-2 and FA-3 produced by Daicel Corporation); an aromatic vinyl monomer such as styrene, vinyl toluene, and α-methylstyrene; methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, cyclohexyl (meth)acrylate, 2-ethylhexyl (meth)acrylate, polyalkylene glycol (meth)acrylate, isobornyl (meth)acrylate, (meth)acrylic acid, N,N-dimethylaminoethyl (meth)acrylate, N,N-diethylaminoethyl (meth)acrylate, N,N-dimethylaminopropyl (meth)acrylate, N,N-di-t-butylaminoethyl (meth)acrylate, and N,N-dimethylaminopropyl (meth)acrylamide. These acrylic monomers may be used alone or in combination of two or more thereof.

In the present description, the term "(meth)acrylic" refers to acrylic or methacrylic, and the term "(meth)acrylate" refers to acrylate or methacrylate.

The acrylic resin (A1) can be obtained by a radical copolymerization reaction of the above-mentioned monomers based on a common method.

The hydroxyl value of the acrylic resin (A1) is generally in the range of 0.1 mg KOH/g to 300 mg KOH/g, and preferably in the range of 10 mg KOH/g to 200 mg KOH/g, and the weight average molecular weight thereof is generally in the range of 1,000 to 100,000, and preferably in the range of 2,000 to 30,000.

In the present description, the terms "number average molecular weight" and "weight average molecular weight" refer to a value that is determined by converting retention time (retention volume) measured by using gel permeation chromatograph (GPC) into the molecular weight of polystyrene based on retention time (retention volume) of standard polystyrene with known molecular weight, measured under the same condition. Specifically, as the gel permeation chromatograph, "HLC-8120GPC" (trade name, produced by Tosoh Corporation) is used, four columns of "TSKgel G-4000HXL", "TSKgel G-3000HXL", "TSKgel G-2500HXL", and "TSKgel G-2000 HXL" (trade names, all produced by Tosoh Corporation) are used as columns, and measurement can be performed under the conditions of a mobile phase tetrahydrofuran, a measurement temperature of 40° C., a flow rate of 1 mL/min, and a detector RI.

Polyester Resin (A2)

The polyester resin (A2) that can be used in the thermosetting coating composition of the present invention can be produced by an esterification reaction and/or a transesterification reaction between an acid component and an alcohol component.

As the above-mentioned acid component, a compound generally used as an acid component in the production of the polyester resin may be used without particular limitation. As the above-mentioned acid component, alicyclic polybasic acids, aliphatic polybasic acids, aromatic polybasic acids, aromatic monocarboxylic acids, aliphatic monocarboxylic acids, alicyclic monocarboxylic acids, and lower alkyl esters of these acids may be used.

Generally, the alicyclic polybasic acid refers to a compound having one or more alicyclic structures (mainly four- to six-membered ring) and two or more carboxyl groups in one molecule, an acid anhydride of the compound, and an esterification product of the compound.

Generally, the aliphatic polybasic acid refers to an aliphatic compound having two or more carboxyl groups in one molecule, an acid anhydride of the compound, and an esterification product of the compound.

Generally, the aromatic polybasic acid refers to an aromatic compound having two or more carboxyl groups in one molecule, an acid anhydride of the aromatic compound, and an esterification product of the aromatic compound.

In addition, aromatic monocarboxylic acids, aliphatic monocarboxylic acids, alicyclic monocarboxylic acids, and the like may also be used as required.

As the above-mentioned alcohol component, compounds generally used as alcohol components in the production of the polyester resin may be used without particular limitation. The alcohol component containing dihydric alcohols such as alicyclic diols, aliphatic diols and aromatic diols, and polyhydric alcohols having three or more hydroxyl groups is preferred.

As a production method of the above-mentioned polyester resin (A2), the above-mentioned acid component is allowed to react with the alcohol component by a common method, thereby producing the polyester resin (A2).

In addition, the above-mentioned polyester resin (A2) may also be modified with a fatty acid, a fat, a polyisocyanate compound, an epoxy compound or the like during the preparation of the resin, or after the esterification reaction and/or the transesterification reaction.

The number average molecular weight of the polyester resin (A2) is generally in the range of 1,000 to 20,000, preferably in the range of 1,050 to 10,000, and more preferably in the range of 1,100 to 5,000, from the viewpoint of the finishing property.

In addition, the hydroxyl value of the polyester resin (A2) is generally in the range of 20 mg KOH/g to 300 mg KOH/g, preferably in the range of 30 mg KOH/g to 250 mg KOH/g, and more preferably in the range of 40 mg KOH/g to 180 mg KOH/g, from the viewpoint of the curability of the obtained coating film.

Epoxy Resin (A3)

The epoxy resin (A3) that can be used in the thermosetting coating composition of the present invention can be obtained by allowing an epoxy resin (A3-1) to react with a modifier (A3-2).

The epoxy resin (A3-1) that may be used as a raw material of the epoxy resin (A3) is a compound having at least one, preferably two or more epoxy groups in one molecule. In terms of the molecular weight of the epoxy resin (A3-1), the number average molecular weight thereof is at least 300, preferably in the range of 400 to 4,000, and more preferably in the range of 800 to 2,500, and epoxy equivalent thereof is at least 160, preferably in the range of 180 to 2,500, and more preferably in the range of 400 to 1,500. As the epoxy resin (A3-1), for example, those obtained by the reaction between a polyphenol compound and an epihalohydrin (for example, epichlorohydrin and the like) may be used.

Examples of the polyphenol compound used for formation of the above-mentioned epoxy resin (A3-1) include bis(4-hydroxyphenyl)-2,2-propane [bisphenol A], bis(4-hydroxyphenyl) methane [bisphenol F], bis(4-hydroxycyclohexyl) methane [hydrogenated bisphenol F], 2,2-bis(4-hydroxycyclohexyl) propane [hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-3-tert-butyl-phenyl)-2,2-propane, bis(2-hydroxynaphthyl) methane, tetra(4-hydroxyphenyl)-1,1,2,2-ethane, 4,4'-dihydroxydiphenyl sulfone, phenolic novolac, and cresol novolac.

In addition, among the epoxy resins (A3-1) obtained by the reaction between the polyphenol compound and the epihalohydrin, a resin represented by the following formula, which is derived from bisphenol, is preferred.

[Chem. 8]

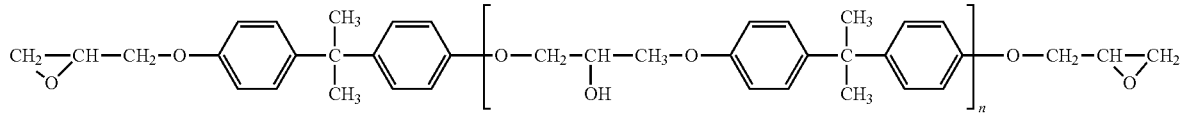

Here, it is preferable that n=0 to 8.

Examples of commercial products of such epoxy resin (A3-1) include products with trade names jER 828 EL, jER 1002, jER 1004, and jER 1007, which are sold by Mitsubishi Chemical Corporation.

The modifier (A3-2) that can be used as a raw material of the epoxy resin (A3) is not particularly limited as long as it is a component having reactivity with the above-mentioned epoxy resin (A3-1). Examples of the modifier (A3-2) include polyhydric alcohols, monohydric alcohols, acidic compounds, phenols, amine compounds, lactones, isocyanate compounds, and xylene formaldehyde compounds.

Examples of the polyhydric alcohols include dihydric alcohols such as ethylene glycol, diethylene glycol, propylene glycol, dipropylene glycol, 1,3-propanediol, 1,3-butanediol, 1,4-butanediol, 2,3-butanediol, 1,5-pentanediol, 1,6-hexanediol, 1,7-heptanediol, 1,8-octanediol, 1,9-nonanediol, 2-methyl-1,3-propanediol, 3-methyl-1,5-pentanediol, 2-methylpentane-2,4-diol, 2,2,4-trimethyl-1,3-pentanediol, triethylene glycol, 2-butyl-2-ethyl-1,3-propanediol, tricyclodecane dimethanol, triethylene glycol, neopentyl glycol, 1,4-cyclohexanediol, 1,3-cyclohexanedimethanol, 1,4-cyclohexanedimethanol, bisphenol A, bisphenol F, hydrogenated bisphenol A, and hydrogenated bisphenol F; polyether diols such as polyethylene glycol, polypropylene glycol, and polybutylene glycol; trihydric alcohols such as glycerin, trimethylol propane, and tris(2-hydroxyethyl) isocyanurate; tetrahydric alcohols such as pentaerythritol; and polyester polyol and acrylic polyol.

Examples of the monohydric alcohols include methanol, ethanol, n-propanol, isopropanol, n-butanol, 2-butanol, pentanol, hexanol, n-octanol, 2-ethylhexanol, dodecyl alcohol, stearyl alcohol, and benzyl alcohol.

Examples of the acidic compound include acidic compounds such as acetic acid, propionic acid, butyric acid, valeric acid, acrylic acid, oleic acid, glycolic acid, lactic acid, benzoic acid, gallic acid, fatty acids, and dibasic acids.

Examples of the above-mentioned phenols include phenol, cresol, ethylphenol, para-tert-butylphenol, nonylphenol, catechol, resorcinol, and 4-tert-butyl catechol.

As the above-mentioned amine compound, any amine compound containing at least one active hydrogen that reacts with an epoxy group may be used without particular limitation. Examples of the amine compound include mono-alkylamine or di-alkylamine such as monomethylamine, dimethylamine, monoethylamine, diethylamine, monoisopropylamine, diisopropylamine, monobutylamine, and dibutylamine; alkanolamine such as monoethanolamine, diethanolamine, mono(2-hydroxypropyl)amine, di(2-hydroxypropyl)amine, monomethylaminoethanol, and monoethylaminoethanol; alkylene polyamine such as ethylene diamine, propylene diamine, butylene diamine, hexamethylene diamine, tetraethylene pentamine, pentaethylene hexamine, diethylaminopropylamine, diethylene triamine, and triethylenetetramine; alkylene imine such as ethyleneimine, and propylenimine; and cyclic amine such as piperazine, morpholine, and pyrazine. In addition, these above-mentioned amines may also be used in combination with amines in a ketimine form of primary amines. These amine compounds may be used alone or in combination of two or more thereof.

As a method of producing the above-mentioned epoxy resin (A3), the above-mentioned epoxy resin (A3-1) is allowed to react with the modifier (A3-2) by a common method, thereby producing the epoxy resin (A3).

In addition, the number average molecular weight of the epoxy resin (A3) is generally in the range of 1,000 to 50,000, preferably in the range of 1,300 to 20,000, and more preferably in the range of 1,600 to 10,000, from the viewpoint of stability of coating composition, finishing property, and corrosion resistance. The hydroxyl value of the epoxy resin (A3) is generally in the range of 10 mg KOH/g to 300 mg KOH/g, preferably in the range of 20 mg KOH/g to 250 mg KOH/g, and more preferably in the range of 30 mg KOH/g to 200 mg KOH/g, from the viewpoint of the curability of the obtained coating film.

Blocked Polyisocyanate Curing Agent (B)

The blocked polyisocyanate curing agent (B) is a product of an addition reaction between a polyisocyanate compound and an isocyanate blocking agent in an approximately stoichiometric amount. As the polyisocyanate compound used in the blocked polyisocyanate curing agent (B), common compounds may be used without particular limitation. Examples of the polyisocyanate compound include aromatic, aliphatic or alicyclic polyisocyanate compounds such as tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, crude MDI [polymethylene polyphenyl isocyanate], bis(isocyanate methyl)cyclohexane, tetramethylene diisocyanate, hexamethylene diisocyanate, methylene diisocyanate, and isophorone diisocyanate; cyclized polymers or birets of these polyisocyanate compounds; and a combination of these polyisocyanate compounds.

On the other hand, the above-mentioned isocyanate blocking agent is added to the isocyanate group of the polyisocyanate compound and blocks the isocyanate group, and the blocked polyisocyanate compound formed by the addition is stable at room temperature. However, it is desirable that the blocking agent dissociates and free isocyanate groups are regenerated when the coating film is heated to baking temperature (generally about 80° C. to about 200° C.).

Examples of the isocyanate blocking agent used in the blocked polyisocyanate curing agent (B) include oxime compounds such as methyl ethyl ketoxime, and cyclohexanone oxime; phenolic compounds such as phenol, para-t-butylphenol, and cresol; alcohol compounds such as n-butanol, 2-ethylhexanol, phenyl carbinol, methyl phenyl carbinol, ethylene glycol monobutyl ether, diethylene glycol monoethyl ether, ethylene glycol, and propylene glycol; lactam compounds such as s-caprolactam, and γ-butyrolactam; active methylene compounds such as dimethyl malonate, diethyl malonate, diisopropyl malonate, ethyl acetoacetate, methyl acetoacetate, and acetylacetone; and pyrazole compounds such as dimethylpyrazole. These isocyanate blocking agents may be used alone or in combination of two or more thereof.

In particular, it is preferable to use at least one selected from alcohol compounds, pyrazole compounds, oxime compounds, and lactam compounds, and alcohol compounds are particularly preferred, from the viewpoint of dissociation temperature and stability of coating composition.

Amine Compound (C)

The thermosetting coating composition of the present invention contains an amine compound (C) represented by the following formula (1).

[Chem.9]

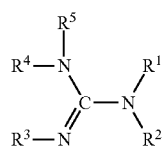

(1)

In the formula (1), $R^1$ to $R^5$ each independently represent a hydrogen atom or an organic group having one or more carbon atoms, and the organic group may contain one or more atoms selected from the group consisting of oxygen atoms, nitrogen atoms, sulfur atoms, and halogen atoms.

The blocking agent is dissociated from the blocked polyisocyanate curing agent (B) by heat (for example, 100° C. or higher). Accordingly, a free isocyanate group is regenerated, and the hydroxyl group-containing resin (A) reacts with the isocyanate group to promote the crosslinking reaction. The amine compound (C) functions as a dissociation catalyst and a catalyst for the transesterification reaction between the hydroxyl group-containing resin (A) and the blocked isocyanate group. For example, the amine compound (C) is used as a strong base catalyst for performing carbamate transesterification. This is due to the high proton acceptance (stabilization of cationic species) caused by a guanidine structure of the amine compound (C). Therefore, in the thermosetting coating composition of the invention, the crosslinking reaction proceeds without using a metal catalyst used in the related art.

Further, in the amine compound represented by the formula (1), at least one of $R^1$ to $R^5$ is preferably a hydrocarbon group having three or more carbon atoms, and it is more preferable that $R^2$ to $R^4$ each independently represent a hydrocarbon group having three or more carbon atoms. Accordingly, the basic strength of the amine compound is enhanced and the flatness described below is also increased, so that the catalytic effect is improved. Examples of the hydrocarbon group include a propyl group, a butyl group, and a cyclohexyl group. In addition, it is more preferable that the hydrocarbon groups having three or more carbon atoms each independently represent a branched or cyclic hydrocarbon group. Examples of the branched or cyclic hydrocarbon group include an isopropyl group and a cyclohexyl group.

The amine compound (C) is preferably an amine compound represented by the following formula (2), from the viewpoint of curability and coating film performance (water resistance and the like).

[Chem. 10]

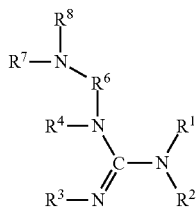

(2)

In the formula (2), the definitions of $R^1$ to $R^4$ are the same as those of the formula (1).

$R^6$ is a bifunctional organic group having one or more carbon atoms, and the organic group may contain one or more atoms selected from the group consisting of oxygen atoms, nitrogen atoms, sulfur atoms and halogen atoms.

$R^1$ and $R^8$ each independently represent a hydrogen atom or an organic group having one or more carbon atoms, and the organic group may contain one or more atoms selected from the group consisting of oxygen atoms, nitrogen atoms, sulfur atoms and halogen atoms.

Further, in the amine compound represented by the formula (2), at least one of $R^2$ to $R^4$, $R^7$, and $R^8$ is each independently preferably a hydrocarbon group having three or more carbon atoms, and $R^2$ and $R^3$ are more preferably a hydrocarbon group having three or more carbon atoms. Accordingly, the basic strength of the amine compound is enhanced and the flatness described below is also increased, so that the catalytic effect is improved. Examples of the hydrocarbon group include a propyl group, a butyl group, and a cyclohexyl group.

In addition, it is more preferable that the hydrocarbon groups having three or more carbon atoms each independently represent a branched or cyclic hydrocarbon group. Examples of the branched or cyclic hydrocarbon group include an isopropyl group and a cyclohexyl group.

The amine compound (C) is preferably an amine compound represented by the following formula (3), from the viewpoint of curability and coating film performance (water resistance and the like).

[Chem. 11]

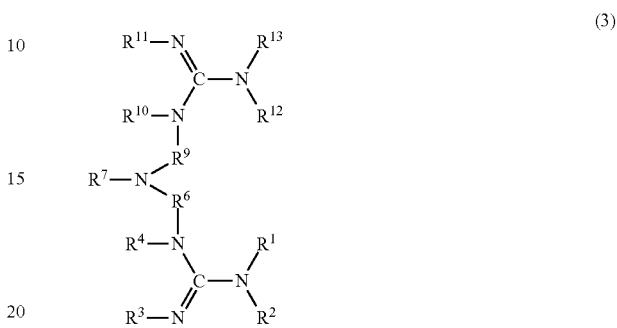

(3)

In the formula (3), the definitions of $R^1$ to $R^4$, $R^6$ and $R^7$ are the same as those of the formulas (1) and (2).

$R^9$ is a bifunctional organic group having one or more carbon atoms, and the organic group may contain one or more atoms selected from the group consisting of oxygen atoms, nitrogen atoms, sulfur atoms and halogen atoms.

$R^{10}$ to $R^{13}$ each independently represent a hydrogen atom or an organic group having one or more carbon atoms, and the organic group may contain one or more atoms selected from the group consisting of oxygen atoms, nitrogen atoms, sulfur atoms and halogen atoms.

Further, in the amine compound represented by the formula (3), at least one of $R^1$ to $R^4$, $R^7$, and $R^{10}$ to $R^{13}$ is each independently preferably a hydrocarbon group having three or more carbon atoms, and $R^2$, $R^3$, $R^{11}$ and $R^{13}$ are more preferably a hydrocarbon group having three or more carbon atoms. Accordingly, the basic strength of the amine compound is enhanced and the flatness described below is also increased, so that the catalytic effect is improved. Examples of the hydrocarbon group include a propyl group, a butyl group, and a cyclohexyl group.

In addition, it is preferable that the hydrocarbon groups having three or more carbon atoms each independently represent a branched or cyclic hydrocarbon group. Examples of the branched or cyclic hydrocarbon group include an isopropyl group and a cyclohexyl group.

The amine compound (C) is preferably an amine compound represented by the following formula (4), from the viewpoint of curability and coating film performance (water resistance and the like). The amine compound (C) has a cyclohexyl group, so that the curability and the water resistance of the coating composition are improved. In addition, as a result of the faster curing reaction rate, the baking temperature for dissociating the isocyanate blocking agent can be lowered.

[Chem. 12]

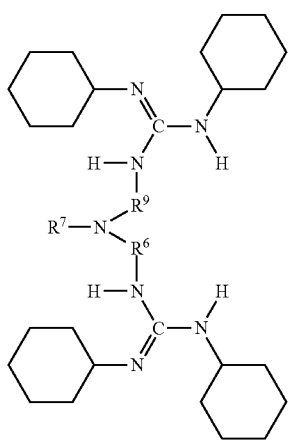

(4)

In the formula (4), the definitions of $R^6$, $R^7$, and $R^9$ are the same as those of the formulas (1) to (3).

On the other hand, in the formulas (1) to (3), it is preferable that at least one of $R^3$ and $R^{11}$ has the structure represented by the following formula (5). When at least one of $R^1$ and $R^{11}$ is the structure represented by the formula (5), the amine compound (C) forms a conjugated structure. Accordingly, the curability of the thermosetting coating composition is improved.

[Chem. 13]

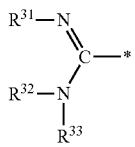

(5)

In the formula (5), $R^{11}$ to $R^{33}$ each independently represent a hydrogen atom or an organic group having one or more carbon atoms, and the organic group may contain one or more atoms selected from the group consisting of oxygen atoms, nitrogen atoms, sulfur atoms and halogen atoms. * represents an atomic bonding.

Examples of $R^{3'}$ to $R^{33}$ include a hydrogen atom, a hydrocarbon group having 3 to 6 carbon atoms, and the organic group having a number average molecular weight of 300 or more (preferably 600 or more). In particular, at least one of $R^3$ to $R^{33}$ is preferably a hydrocarbon group having 3 to 6 carbon atoms, and examples of such a group include a propyl group, a butyl group and a cyclohexyl group.

In addition, the organic group having 3 to 6 carbon atoms is more preferably a branched or cyclic hydrocarbon group, and examples of such a group include an isopropyl group and a cyclohexyl group.

In addition, in the amine compound (C) of the present invention, at least one organic group of $R^1$ to $R^{13}$ preferably has a number average molecular weight of 300 or more, and more preferably has a number average molecular weight of 600 or more in the formulas (1) to (4). The number average molecular weight of preferably $R^5$ in the formula (1), and more preferably $R^1$ in the formulas (2), (3), and (4) is preferably 300 or more, and more preferably 600 or more.

The amine compound (C) has an organic group having a number average molecular weight of 300 or more, so that various properties (such as water resistance) of the obtained coating film are improved.

In order to obtain the amine compound (C) having an organic group with a number average molecular weight of 300 or more, a compound having a number average molecular weight of 300 or more (e.g., a compound having an epoxy group or an isocyanate group) is allowed to react, the compound possibly becoming an organic group by the reaction with an active hydrogen group (e.g., active hydrogen group contained in a primary amino group or a secondary amino group) of the amine compounds of the formulas (1) to (4). Specifically, examples of such compounds include an acrylic resin, a polyester resin, a urethane resin, an epoxy resin, and a polyisocyanate compound, each having an epoxy group or an isocyanate group.

In addition, the compound having a number average molecular weight of 300 or more may have a plurality of reactive groups such as an epoxy group and an isocyanate group in the molecule, and may have been reacted with active hydrogen groups of the amine compounds in response to the reactive groups (that is, a plurality of amine compounds react with one compound having a number average molecular weight of 300 or more).

In the amine compound (C) of the present invention, the guanidine structure is preferably acyclic.

Regarding the term "cyclic" or "acyclic" as mentioned herein, a structure in which at least two of the three organic groups of "$R^1$ and/or $R^2$", "$R^3$", and "$R^4$ and/or $R^5$" in the formula (1) are linked to each other and are cyclized is "cyclic", and structures other than the above structure are "acyclic".

In a case where the organic group of $R^1$ to $R^5$ has a cyclic structure therein (for example, when any one of $R^1$ to $R^5$ has a cyclic organic group such as a cyclohexyl group or a benzyl group), the guanidine structure is "acyclic".

The amine compound (C) also relates to an amine compound having a structure represented by at least one of the formulas (6) and (7).

[Chem. 14]

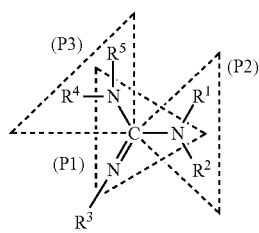

(6)

In the formula (6), $R^1$ to $R^5$ each independently represent a hydrogen atom or an organic group having one or more carbon atoms, and the organic group may contain one or more atoms selected from the group consisting of oxygen atoms, nitrogen atoms, sulfur atoms, and halogen atoms.

[Chem. 15]

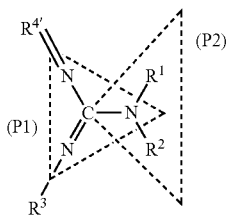

(7)

In the formula (7), $R^1$ to $R^3$, and $R^{4'}$ each independently represent a hydrogen atom or an organic group having one or more carbon atoms, and the organic group may contain one or more atoms selected from the group consisting of oxygen atoms, nitrogen atoms, sulfur atoms, and halogen atoms.

Here, in the formula (6), the average dihedral angle α shown in the following equation (A) obtained by a structural optimization calculation based on a density functional theory calculation B3LYP/6-31G * is 20 degrees (°) or less:

Dihedral Angle α=[(dihedral angle between $P1$ and $P2$)+(dihedral angle between $P1$ and $P3$)]/2    (A)

wherein P1 is a plane containing three N atoms, P2 is a plane containing $C(R^1)$ $(R^2)$, and P3 is a plane containing $C(R^4)(R^5)$ In addition, in the formula (7), the dihedral angle α shown in the following equation (B) obtained by the structural optimization calculation based on the density functional theory calculation B3LYP/6-31G * is 20 degrees (°) or less:

Dihedral Angle α=[(dihedral angle between $P1$ and $P2$)]    (B)

wherein P1 is a plane containing three N atoms, and P2 is a plane containing $C(R^1)(R^2)$ When the dihedral angle α is 20° or less, the catalytic effect of the amine compound (C) in the thermosetting coating composition is improved, and the curability is enhanced.

The dihedral angle α is an index indicating flatness of the amine compound (C). The smaller α is, the smaller the angles at which the P2 and P3 planes join to the P1 plane [in the case of the above formula (6)] or the angle at which the P2 plane joins to the P1 plane [in the case of the above formula (7)] is, which means the flatness of the amine compound (C) is high. The amine compound (C) represented by the formula (6) and/or the formula (7) is a compound having a so-called guanidine structure, and is known as a compound showing strong basicity. The strong basicity is led by causing the positive charge of the conjugated acid to be delocalized and significantly stabilized by the resonance structure as shown below. These resonance structures are derived from a p orbital of the central carbon atom and a π bond of the lone electron pair of the nitrogen atom (without a double bond), and in general, the larger the overlap between orbitals is, the more stable the structure is. Therefore, the dihedral angle(s) defined by "P1-P2" and/or "P1-P3" is small (i.e. high in flatness), that is, as the overlap between the p orbital of central carbon atom and the lone electron pair of the nitrogen atom (without double bond) is increased, the conjugated acid is expected to be stabilized and have high basicity. Therefore, as the above-mentioned dihedral angle is reduced, the catalytic effect is improved.

Further, in a case where the amine compound has two or more kinds of the above-mentioned structures (structure(s) of the formula (6) and/or the formula (7)) in the molecule, the dihedral angle (the smaller value) of the structure by which the higher catalytic effect can be expressed is set as the dihedral angle of the amine compound.

[Chem. 16]

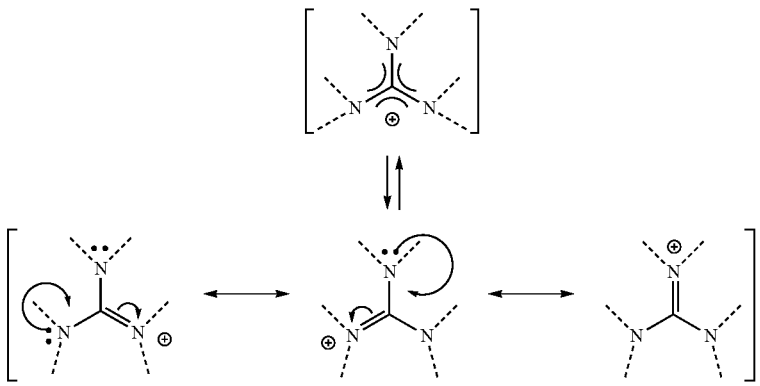

The calculation of the catalytic effect of amine catalysts based on dihedral angles as described above has not been previously recognized in the field. However, with the progress of computational science in recent years, the dihedral angle can be analyzed, and it is found that the correlation is very high as compared to the measured value of the gel fraction that indicates curability. When $R^1$ to $R^5$ are organic groups having one or more carbon atoms, preferably $R^2$ to $R^5$ are organic groups having one or more carbon atoms, and more preferably $R^2$ to $R^5$ are organic groups having a bulky structure such as an isopropyl group or a cyclohexyl group, the flatness is higher and the catalytic effect is high. Accordingly, such amine compound is preferred.

In addition, in a case where the dihedral angles indicating flatness are almost the same (for example, the difference between the dihedral angles of the isopropyl group and the dihedral angle of the cyclohexyl group is about 1 to 2), the organic group having a stronger electron donating group enhances the basicity of the catalyst, and thus, the curability is improved. Therefore, the organic groups in $R^1$ to $R^5$ in the above-mentioned formulas (6) and (7) are more preferably cyclohexyl groups as compared to isopropyl groups.

The amine compound (C) represented by the formula (1) can be synthesized by combining common methods, and can be synthesized, for example, by the following synthesis method (I) or (II). The following synthesis method (I) is a synthesis example of the case where $R^3$ in the formula (1) is a hydrogen atom, and the following synthesis method (II) is a synthesis example of the case where $R^2$ in the formula (1) is a hydrogen atom.

[Chem. 17]

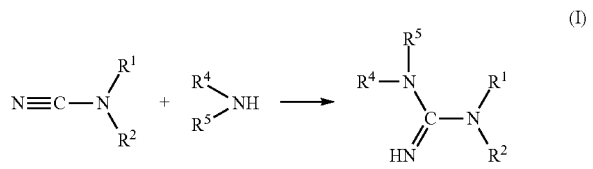

(I)

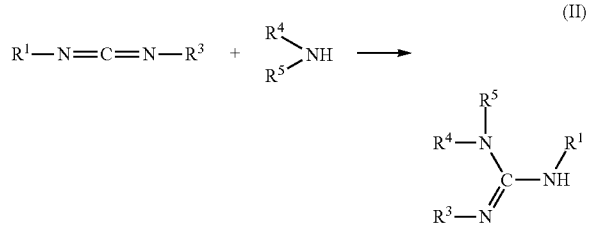

(II)

In addition, in order to obtain a compound represented by the above formula (3) or a compound represented by the above formula (4), that is, a symmetric amine compound (C) having two guanidyl groups, the following synthesis method (III) may be mentioned, for example.

[Chem. 18]

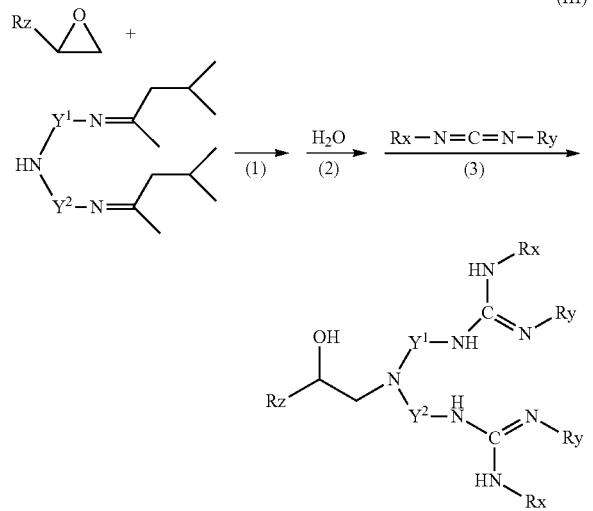

(III)

[In the above, the reaction (1) is a reaction between a glycidyl group and a secondary amine, the reaction (2) is a hydrolysis reaction of ketimine (generation of a primary amine), and the reaction (3) is a reaction between a carbodiimide compound and a primary amine.]

In the above-mentioned synthesis method, Rz represents an organic group having one or more carbon atoms, and preferably has a number average molecular weight of 300 or more. Y1 and Y2 each represent an alkylene group, and the carbon number of the alkylene group is preferably 2 to 8, more preferably 2 to 3, and particularly preferably 2. Rx and Ry each represent a linear, branched or cyclic alkyl group, preferably a propyl group, a butyl group or a cyclohexyl group, more preferably an isopropyl group or a cyclohexyl group, and still more preferably a cyclohexyl group.

In addition, the conjugated guanidine compound having the structure represented by the formula (5) can be synthesized by combining common methods, and can be synthesized, for example, by the following synthesis method (IV) or (V). The following synthesis method (IV) is a synthesis example of the case where $R^{33}$ in the formula (5) is a hydrogen atom, and the following synthesis method (V) is a synthesis example of the case where $R^{3'}$ in the formula (5) is a hydrogen atom.

[Chem. 19]

(IV)

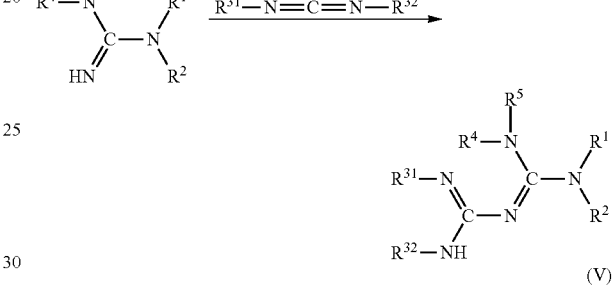

(V)

Thermosetting Coating Composition

The blending ratio of the hydroxyl group-containing resin (A) and the blocked polyisocyanate curing agent (B) in the thermosetting coating composition of the present invention is as follows: the mass percentage of the component (A) is generally in the range of 10 mass % to 90 mass % and preferably in the range of 20 mass % to 80 mass %, and the mass percentage of the component (B) is generally in the range of 10 mass % to 60 mass % and preferably in the range of 15 mass % to 55 mass %, based on the total mass of the resin solid content of the coating composition. The above blending ratio is preferred in order to obtain a coated article excellent in finishing property and curability. Either the coating composition properties or the coating film performance may be impaired if the blending ratio(s) falls outside the above range, which is not preferred.

In addition, the content of the amine compound (C) (the content from which the mass of an organic group is excluded when the organic group having a molecular weight of 300 or more has been added) is generally in the range of 0.01 mass % to 30 mass %, and preferably in the range of 0.1 mass % to 10 mass %, based on the total mass of the resin solid content of the coating composition. The above content of the amine compound (C) is preferred, from the viewpoint of curability.

The thermosetting coating composition of the present invention is not particularly limited. In addition to the components (A) to (C), the thermosetting coating composition may contain a pigment dispersion paste, a solvent such as water and an organic solvent, a neutralizer, a surfactant, a surface conditioner, a thickener, an anti-settling agent, a UV absorber, a light stabilizer, an antifoam agent, a dissociation catalyst, plasticizer, and the like.

The pigment dispersion paste is a paste in which a pigment such as a color pigment, an antirust pigment and an extender pigment has been dispersed in fine particles in advance. For example, the pigment dispersion paste can be prepared by blending a resin for pigment dispersion with a neutralizer, a solvent and a pigment, and dispersing the mixture by a dispersion mixer such as a ball mill, a sand mill, or a pebble mill.

As the above-mentioned pigment, common pigments may be used without particular limitation. For example, the following pigments may be added: a coloring pigment such as titanium dioxide, zinc oxide, zinc phosphate, aluminum phosphate, zinc molybdate, calcium molybdate, iron blue, ultramarine, cobalt blue, copper phthalocyanine blue, indanthrone blue, synthetic yellow iron oxide, transparent bengara (yellow), bismuth vanadate, titanium yellow, zinc yellow, monoazo yellow, isoindolinone yellow, metal complex salt azo yellow, quinophthalone yellow, benzimidazolone yellow, bengara, monoazo red, quinacridone red, azo lake (Mn salt), quinacridone magenta, ansanthrone orange, jean slaquinonil red, perylene maroon, quinacridone magenta, perylene red, diketopyrrolopyrrole chrome vermilion, chlorinated phthalocyanine green, brominated phthalocyanine green, pyrazolone orange, benzimidazolone orange, dioxazine violet, and perylene violet; an extender pigment such as barista powders, barium sulfate, barium carbonate, calcium carbonate, plaster, clay, white carbon, diatomaceous earth, talc, magnesium carbonate, alumina white, gross white, and mica powders; and an antirust pigment such as aluminum phosphomolybdate, aluminum tripolyphosphate, and zinc oxide (zinc flower).

As the above-mentioned solvent, common solvents such as water or organic solvents may be used without limitation. Examples of the organic solvent include hydrocarbons such as toluene, xylene, cyclohexane and n-hexane; esters such as methyl acetate, ethyl acetate, and butyl acetate; ketones such as acetone, methyl ethyl ketone, methyl isobutyl ketone, methyl amyl ketone, and isobutyl methyl ketone; amides such as dimethylformamide and dimethyl acetamide; alcohols such as methanol, ethanol, n-propanol, and iso-propanol; ether alcohol compounds such as ethylene glycol monobutyl ether, diethylene glycol monoethyl ether, and propylene glycol monomethyl ether; and a mixture thereof.

In addition, bismuth compounds, zinc compounds, titanium compounds, amidine compounds, phosphazene compounds, quaternary salt compounds, proazaphosphatran compounds, other than the amine compound (C) used in the present application, are suitably used as a dissociation catalyst for the isocyanate blocking agent. It is preferable that organic tin compounds such as dibutyltin dibenzoate, dioctyltin oxide, and dibutyltin oxide are not substantially used due to environmental considerations.

Method of Forming Coating Film

As the method of forming a coating film used in the present invention, common coating methods such as brush coating, roller coating, dipping coating, bar coater coating, applicator coating, curtain coating, spray coating, rotary atomization coating, electrodeposition coating, and the like may be used without particular limitation.

The thickness of the coating film is not particularly limited, and may be generally in the range of 5 µm to 60 µm, and preferably in the range of 10 µm to 40 µm, based on the dry coating film.

In addition, baking and drying of the coating film is performed by heating the coating film at 60° C. to 300° C., and preferably 80° C. to 200° C., which is temperature of a surface of the object to be coated, for 3 minutes to 180 minutes, and preferably 10 minutes to 50 minutes using drying equipment such as an electric hot air dryer and a gas hot air dryer. A cured coating film can be obtained by the above-mentioned baking and drying.

Examples of the objects to be coated of the present invention include an automobile body, an automobile component, motorcycle parts, household equipment, and other equipment, and examples of the material of the objects to be coated include metal, plastic, inorganic materials, wood, and fiber materials. The objects to be coated and the material thereof are not particularly limited. In the case of the metal material, the object to be coated may be an object whose surface is washed by alkaline degreasing as required and then is subjected to surface treatment such as phosphate conversion treatment and chromate treatment as further required, and may be coated with an under-coating composition.

The above-mentioned object to be coated is coated with the thermosetting coating composition of the present invention, thereby obtaining a coated article.

EXAMPLE

Hereinafter, the present invention is described in more detail by production examples, examples and comparative examples, but the present invention is not limited thereto. The term "part" in the examples shows a mass part and the symbol "/%" shows mass % therein.

Production of Hydroxyl Group-Containing Resin (A)

Production Example 1 (Acrylic Resin)

To a four-necked flask provided with a stirrer, a thermometer, a cooling tube and a nitrogen inlet, 31 parts of propylene glycol monomethyl ether were added, and the temperature therein was raised to 110° C. while introducing nitrogen gas. After the temperature reached 110° C., the introduction of nitrogen was stopped, and a mixture including 22 parts of 2-hydroxyethyl acrylate, 30 parts of methyl methacrylate, 22 parts of 2-ethylhexyl acrylate, 25 parts of styrene, 1 part of acrylic acid, and 4 parts of 2,2'-azobis(isobutyronitrile) was dropped over four hours. Then, the mixture was aged at 110° C. for two hours while introducing nitrogen gas, and then was cooled to 100° C. and was diluted with propylene glycol monomethyl ether, thereby obtaining an acrylic resin (A-1) solution having a solid content of 60%.

The acrylic resin (A-1) had a weight average molecular weight of 15,000 and a hydroxyl value of 106 mg KOH/g.

Production Example 2 (Epoxy Resin)

To a flask provided with a stirrer, a thermometer, a nitrogen inlet tube and a reflux condenser, 950 parts of jER1001 (trade name, produced by Mitsubishi Chemical Corporation, epoxy resin, epoxy equivalent 475, number average molecular weight 900), 236 parts of 1,6-hexanediol, and 0.2 g of dimethyl benzylamine were added, and the mixture was allowed to react with each other at 200° C. until the epoxy equivalent became 30,000 or more, and further ethylene glycol monobutyl ether was added to the flask, thereby obtaining an epoxy resin (A-2) solution having a solid content of 60%. The number average molecular weight of the epoxy resin (A-2) was 2,500.

Production of Blocked Polyisocyanate Curing Agent (B)

Production Example 3

To a four-necked flask provided with a stirrer, a heating device, a cooling device and a pressure reducing device, 272 parts of hexamethylene diisocyanate and 214 parts of methyl ethyl ketone were added, followed by heating to 60° C. Then, 169 parts of methyl ethyl ketoxime were gradually added to the four-necked flask over one hour while stirring. Thereafter, the mixture was allowed to react at 60° C. for two hours, and then 59 parts of trimethylolpropane were gradually added thereto so that the temperature would not reach 70° C. or more. Under stirring, the reaction mixture was allowed to react at 60° C. until no free isocyanate group was detected by infrared spectroscopy. After completion of the reaction, a blocked polyisocyanate curing agent (B-1) having a solid content of 70% was obtained. The NCO amount of the obtained blocked polyisocyanate curing agent (B-1) was 16.4%.

Production of Amine Compound (C)

Among the amine compounds (C-1) to (C-16) shown in Table 1 below, amine compounds (C-3) to (C-14) other than commercial products were produced in accordance with the following Production Examples 4 to 15.

Further, in addition to the compounds shown in Table 1, the amine compounds produced in accordance with the following Production Examples 4 to 15 may have by-products, unreacted substances, and the like.

In addition, the epoxy-amine value described in the production example was measured by the following method.

<Method of Measuring Epoxy-Amine Value>

The epoxy-amine value (meq/g) in the present invention is a total number of millimoles of epoxy functional groups and amine functional groups per gram of a sample containing a solvent. The epoxy equivalent (grams of the component containing one gram equivalent of an epoxy group) determined in accordance with JIS K7236: 2009 is a value calculated by the following equation after measuring both the epoxy functional group and the amine functional group in the sample of the present invention.

Epoxy-amine value (meq/g)=1000/epoxy equivalent (measurement result of JIS K 7236: 2009)

TABLE 1

| Production Example | Amine Compound | Structure | |
|---|---|---|---|
| Production Example 4 | (C-1) (C-2) (C-3) | $R^4-N\overset{R^5}{\underset{\underset{R^3-N}{\parallel}}{\mid}}\overset{R^1}{\underset{R^2}{\diagdown N}}$ | $R^1, R^2, R^3, R^4$: Me $R^2$ to $R^4$: iPr $R^2$ to $R^4$: Cy |

TABLE 1-continued

| Production Example | Amine Compound | Structure | |
|---|---|---|---|
| Production Example 5 | (C-4) | $R_{31}-N=C\overset{R^5}{\underset{\underset{N}{\parallel}}{\mid}}\overset{R^1}{\underset{R^2}{\diagdown N}}$ with $R_{32}$, $R_{33}$ substituents | $R^1, R^2, R^4, R^5$: Me $R^{31}, R^{32}$: Cy |
| Production Example 6 | (C-5) | $R^7-N\overset{R^6}{\underset{(CH_2)_2}{\mid}}\overset{R^1}{\underset{R^2}{\diagdown}}$ with C=N structure | $R^2, R^3$: iPr, $R^7, R^8$: Me |
| Production Example 7 | (C-6) | | $R^2, R^3$: Cy, $R^7, R^8$: Me |
| Production Example 8 | (C-7) | | $R^2, R^3$: Cy, $R^7$: EP1, $R^8$: Me |
| Production Example 9 | (C-8) | | $R^2, R^3$: Cy, $R^7$: EP2, $R^8$: Me |
| Production Example 10 | (C-9) | $R^{10}-N\overset{R^{11}-N}{\underset{(CH_2)}{\mid}}\overset{R^{13}}{\underset{R^{12}}{\diagdown}}$ structure with C=N | $R^2, R^3, R^{11}, R^{13}$: iPr, $R^7$: Me |
| Production Example 11 | (C-10) | | $R^2, R^3, R^{11}, R^{13}$: Cy, $R^7$: Me |
| Production Example 12 | (C-11) | | $R^2, R^3, R^{11}, R^{13}$: iPr, $R^7$: EP1 |
| Production Example 13 | (C-12) | | $R^2, R^3, R^{11}, R^{13}$: Cy, $R^7$: EP1 |
| Production Example 14 | (C-13) | | $R^2, R^3, R^{11}, R^{13}$: Cy, $R^7$: EP2 |
| Production Example 15 | (C-14) | $R^7-N(CH_2)_2-NH_2$ structure with two NH$_2$ groups | $R^7$: EP1 |
| | (C-15) | CH—N—CH structure | Diisopropylamine |
| | (C-16) | bicyclic structure | Diazabicyclo undecene (DBU) |

Me: methyl group,
Et: ethyl group,
iPr: isopropyl group,
Cy: cyclohexyl group,
and the others not described therein is hydrogen atom.
EP1: a group that makes a compound mainly containing jER828 (trade name, produced by Mitsubishi Chemical Corporation, epoxy resin, epoxy equivalent 190, number average molecular weight 370) react.
EP2: a group that makes a compound mainly containing jER1001 (trade name, produced by Mitsubishi Chemical Corporation, epoxy resin, epoxy equivalent 475, number average molecular weight 900) react.

Production Example 4: Amine Compound (C-3)

To a flask provided with a stirrer, a thermometer, and a reflux condenser, 103 parts of dicyclohexylcarbodiimide, 49.5 parts of cyclohexylamine, 275 parts of t-butanol were added, and a reaction was performed while the mixture was heated to reflux. It was confirmed that the absorption caused by the carbodiimide at 2120 cm$^{-1}$ was substantially not observed in the measurement of infrared absorption spectrum (hereinafter, referred to as IR). After t-butanol was removed by reducing pressure, ethylene glycol monobutyl ether was added to adjust the solid content, thereby obtaining an amine compound (C-3) solution having a solid content of 50%.

Production Example 5: Amine Compound (C-4)

To a flask provided with a stirrer, a thermometer, and a reflux condenser, 103 parts of dicyclohexyl carbodiimide, 57.5 parts of 1,1,3,3-tetramethylguanidine and 18 parts of t-butanol were added, and a reaction was performed while the mixture was heated to reflux. It was confirmed that the absorption caused by the carbodiimide at 2120 cm$^{-1}$ was substantially not observed in the measurement of IR. After t-butanol was removed by reducing pressure, ethylene glycol monobutyl ether was added to adjust the solid content, thereby obtaining an amine compound (C-4) solution having a solid content of 50%.

Production Example 6: Amine Compound (C-5)

To a flask provided with a stirrer, a thermometer, and a reflux condenser, 126 parts of diisopropyl carbodiimide, 88 parts of N, N-dimethylethylenediamine, and 54 parts of t-butanol were added, and a reaction was performed while the mixture was heated to reflux. It was confirmed that the absorption caused by the carbodiimide at 2120 cm$^{-1}$ was substantially not observed in the measurement of IR. After t-butanol was removed by reducing pressure, ethylene glycol monobutyl ether was added to adjust the solid content, thereby obtaining an amine compound (C-5) solution having a solid content of 50%.

Production Example 7: Amine Compound (C-6)

To a flask provided with a stirrer, a thermometer, and a reflux condenser, 206 parts of dicyclohexyl carbodiimide, 88 parts of N, N-dimethylethylenediamine, and 74 parts of t-butanol were added, and a reaction was performed while the mixture was heated to reflux. It was confirmed that the absorption caused by the carbodiimide at 2120 cm$^{-1}$ was substantially not observed in the measurement of IR. After t-butanol was removed by reducing pressure, ethylene glycol monobutyl ether was added to adjust the solid content, thereby obtaining an amine compound (C-6) solution having a solid content of 50%.

Production Example 8: Amine Compound (C-7)

To a flask provided with a stirrer, a thermometer, and a reflux condenser, 190 parts of jER828 (trade name, produced by Mitsubishi Chemical Corporation, epoxy resin, epoxy equivalent 190, number average molecular weight 370), 170 parts of ketimine block bodies of N-methylethylenediamine, and 177 parts of isobutyl methyl ketone were added, the temperature therein was raised to 120° C., and the mixture was allowed to react until the total epoxy-amine value (including ketimine block bodies) was 3.75 meq/g or less. Next, 25 parts of ethylene glycol monobutyl ether, 18 parts of deionized water, and 206 parts of dicyclohexylcarbodiimide were added to the flask and the mixture was allowed to react at 95° C. It was confirmed that the absorption caused by the carbodiimide at 2120 cm$^{-1}$ was substantially not observed in the measurement of IR. Isobutyl methyl ketone was added to adjust the solid content, thereby obtaining an amine compound (C-7) solution having a solid content of 50%.

Production Example 9: Amine Compound (C-8)

To a flask provided with a stirrer, a thermometer, and a reflux condenser, 475 parts of jER 1001 (trade name, produced by Mitsubishi Chemical Corporation, epoxy resin, epoxy equivalent 475, number average molecular weight 900), 170 parts of ketimine block bodies of N-methylethylenediamine, and 645 parts of isobutyl methyl ketone were added, the temperature therein was raised to 120° C., and the mixture was allowed to react until the total epoxy-amine value (including ketimine block bodies) was 1.57 meq/g or less. Next, 25 parts of ethylene glycol monobutyl ether, 18 parts of deionized water, and 206 parts of dicyclohexylcarbodiimide were added to the flask and the mixture was allowed to react at 95° C. It was confirmed that the absorption caused by the carbodiimide at 2120 cm$^{-1}$ was substantially not observed in the measurement of IR. Isobutyl methyl ketone was added to adjust the solid content, thereby obtaining an amine compound (C-8) solution having a solid content of 50%.

Production Example 10: Amine Compound (C-9)

To a flask provided with a stirrer, a thermometer, and a reflux condenser, 252 parts of diisopropyl carbodiimide, 117 parts of N,N-bis(2-aminoethyl)methylamine, and 92 parts of t-butanol were added, and a reaction was performed while the mixture was heated to reflux. It was confirmed that the absorption caused by the carbodiimide at 2120 cm$^{-1}$ was substantially not observed in the measurement of IR. After t-butanol was removed by reducing pressure, ethylene glycol monobutyl ether was added to adjust the solid content, thereby obtaining an amine compound (C-9) solution having a solid content of 50%.

Production Example 11: Amine Compound (C-10)

To a flask provided with a stirrer, a thermometer, and a reflux condenser, 413 parts of dicyclohexyl carbodiimide, 117 parts of N,N-bis(2-aminoethyl)methylamine, and 133 parts of t-butanol were added, and a reaction was performed while the mixture was heated to reflux. It was confirmed that the absorption caused by the carbodiimide at 2120 cm$^{-1}$ was substantially not observed in the measurement of IR. After t-butanol was removed by reducing pressure, ethylene glycol monobutyl ether was added to adjust the solid content, thereby obtaining an amine compound (C-10) solution having a solid content of 50%.

Production Example 12: Amine Compound (C-11)

To a flask provided with a stirrer, a thermometer, and a reflux condenser, 190 parts of jER828 (trade name, produced by Mitsubishi Chemical Corporation, epoxy resin, epoxy equivalent 190, number average molecular weight 370), 267 parts of ketimine block bodies of diethylene triamine, and 225 parts of isobutyl methyl ketone were added, the temperature therein was raised to 120° C., and the mixture was allowed to react until the total epoxy-amine value (including ketimine block bodies) was 4.43 meq/g or less. Next, 25 parts of ethylene glycol monobutyl ether, 36 parts of deionized water, and 252 parts of diisopropylcarbodiimide were added to the flask and the was allowed to react at 95° C. It was confirmed that the absorption caused by the carbodiimide at 2120 cm$^{-1}$ was substantially not observed in the measurement of IR. Isobutyl methyl ketone was added to adjust the solid content, thereby obtaining an amine compound (C-11) solution having a solid content of 50%.

Production Example 13: Amine Compound (C-12)

To a flask provided with a stirrer, a thermometer, and a reflux condenser, 190 parts of jER828 (trade name, produced by Mitsubishi Chemical Corporation, epoxy resin, epoxy equivalent 190, number average molecular weight 370), 267 parts of ketimine block bodies of diethylene triamine, and 225 parts of isobutyl methyl ketone were added, the temperature therein was raised to 120° C., and the mixture was allowed to react until the total epoxy-amine value (including ketimine block bodies) was 4.43 meq/g or less. Next, 25 parts of ethylene glycol monobutyl ether, 36 parts of deionized water, and 412 parts of dicyclohexylcarbodiimide were added to the flask and the mixture was allowed to react at 95° C. It was confirmed that the absorption caused by the carbodiimide at 2120 cm$^{-1}$ was substantially not observed in the measurement of IR. Isobutyl methyl ketone was added to the solid content, thereby obtaining an amine compound (C-12) solution having a solid content of 50%.

Production Example 14: Amine Compound (C-13)

To a flask provided with a stirrer, a thermometer, and a reflux condenser, 475 parts of jER1001 (trade name, produced by Mitsubishi Chemical Corporation, epoxy resin, epoxy equivalent 475, number average molecular weight 900), 267 parts of ketimine block bodies of diethylene triamine, and 742 parts of isobutyl methyl ketone were added, the temperature therein was raised to 120° C., and the mixture was allowed to react until the total epoxy-amine value (including ketimine block bodies) was 2.03 meq/g or less. Next, 25 parts of ethylene glycol monobutyl ether, 36 parts of deionized water, and 412 parts of dicyclohexylcarbodiimide were added to the flask and the mixture was allowed to react at 95° C. It was confirmed that the absorption caused by the carbodiimide at 2120 cm$^{-1}$ was substantially not observed in the measurement of IR. Isobutyl methyl ketone was added to adjust the solid content, thereby obtaining an amine compound (C-13) solution having a solid content of 50%.

Production Example 15: Amine Compound (C-14)

To a flask provided with a stirrer, a thermometer, and a reflux condenser, 190 parts of jER828 (trade name, produced by Mitsubishi Chemical Corporation, epoxy resin, epoxy equivalent 190, number average molecular weight 370), 267 parts of ketimine block bodies of diethylene triamine, and 225 parts of isobutyl methyl ketone were added, the temperature therein was raised to 120° C., and the mixture was allowed to react until the total epoxy-amine value (including ketimine block bodies) was 4.43 meq/g or less. Next, 36 parts of deionized water and ethylene glycol monobutyl ether were added to adjust the solid content, thereby obtaining an amine compound (C-14) solution having a solid content of 50%.

Production of Pigment Dispersion Paste

Production Example 16: Pigment Dispersion Paste

To a flask provided with a stirrer, a thermometer, and a dropping funnel, 1010 parts of jER828 (trade name, produced by Mitsubishi Chemical Corporation, epoxy resin, epoxy equivalent 190, number average molecular weight 370), 390 parts of bisphenol A, 240 parts of plaxel 212 (trade name, polycaprolactone diol, produced by Daicel Chemical Industries, Ltd., weight average molecular weight being about 1,250), and 0.2 part of dimethyl benzylamine were added, and the mixture was allowed to react at 130° C. until the epoxy equivalent reached about 1,090. Next, 134 parts of dimethylethanolamine and 150 parts of 90% aqueous lactic acid solution were added to the flask and the mixture was allowed to react at 120° C. for four hours. Then, methyl isobutyl ketone was added to adjust the solid content, thereby obtaining a resin solution for dispersing a quaternary ammonium salt pigment having a solid content of 60%.

Subsequently, 8.3 parts (solid content 5 parts) of the resin solution for dispersing a pigment, 14.5 parts of titanium oxide, 8.0 parts of purified clay, 0.3 part of carbon black, and 24.5 parts of propylene glycol monomethyl ether were added, and were dispersed for 20 hours with a ball mill, thereby obtaining a pigment dispersion paste having a solid content of 50%.

Production of Thermosetting Coating Composition

Example 1: Thermosetting Coating Composition (X-1)

58.3 parts (solid content 35 parts) of acrylic resin (A-1) solutions obtained in Production Example 1, 58.3 parts (solid content 35 parts) of the epoxy resin (A-2) solutions obtained in Production Example 2, 42.9 parts (solid content 30 parts) of the blocked polyisocyanate curing agents (B-1) obtained in Production Example 3, and 1.7 parts (solid content 1.7 parts, 0.015 mol per 100 parts of resin solid contents) of the amine compound (C-1) were blended and were uniformly stirred. Further, propylene glycol monomethyl ether was added to the mixture, thereby producing the thermosetting coating composition (X-1) having a solid content of 50%.

Examples 2 to 13 and Comparative Examples 1 to 4: Thermosetting Coating Compositions (X-2) to (X-17)

Thermosetting coating compositions (X-2) to (X-17) having a solid content of 50% were produced in a manner similar to that of Example 1 except that the amine compounds (C) were changed to those shown in Table 2 below.

Further, regarding the thermosetting coating compositions (X-7, X-8, X-11, X-12, X-13, and X-14) respectively blended with the amine compounds (C-7, C-8, C-11, C-12, C-13, and C-14) to which an epoxy resin (EP1 or EP2) was added, the epoxy resin (A-2) was blended such that the total mass of the solid contents of the epoxy resin (A-2) and the epoxy resin (EP1 or EP2) was 35 parts.

Example 14: Thermosetting Coating Composition (Y-1)

50 parts (solid content 30 parts) of the acrylic resin (A-1) solutions obtained in Production Example 1, 58.3 parts (solid content 35 parts) of the epoxy resin (A-2) solutions obtained in Production Example 2, 42.9 parts (solid content 30 parts) of the blocked polyisocyanate curing agents (B-1) obtained in Production Example 3, 55.6 parts (solid content 27.8 parts, resin solid content 5 parts) of the pigment dispersion paste obtained in Production Example 16, and 1.7 parts (solid content 1.7 parts, 0.015 mol per 100 parts of resin solid contents) of the amine compound (C-1) were blended and were uniformly stirred. Further, propylene glycol monomethyl ether was added to the mixture, thereby producing the thermosetting coating composition (Y-1) having a solid content of 50%.

Examples 15 to 26 and Comparative Examples 5 to 8: Thermosetting Coating Compositions (Y-2) to (Y-17)

The thermosetting coating compositions (Y-2) to (Y-17) having a solid content of 50% were produced in a manner similar to that of Example 14 except that the amine compounds (C) were changed to those shown in Table 3 below. Similarly in examples 15 to 26, the amine compound (C) was blended in an amount of 0.015 mol per 100 parts of resin solid contents. Regarding the thermosetting coating compositions (Y-7, Y-8, Y-11, Y-12, Y-13, and Y-14) respectively blended with the amine compounds (C-7, C-8, C-11, C-12, C-13, and C-14) to which the epoxy resin (EP1 or EP2) was added, the epoxy resin (A-2) was blended in a solid content mass obtained by subtracting the solid content mass of the epoxy resin (EP1 or EP2) of 35 parts from 35 parts of the solid content mass of the epoxy resin (A-2).

Evaluation tests were performed by the method described below, and the results about curability (gel fraction) and the flatness (dihedral angle) are shown in Table 2 below, and the results about water resistance (gloss retention) are shown in Table 3 below.

TABLE 2

| Example/ Comparative Example | | Thermo- setting coating composition | Amine compound | Cur- ability | Flatness | |
|---|---|---|---|---|---|---|
| | | | | | Dihedral angle (degree) | Evalu- ation |
| Example | 1 | X-1 | (C-1) | C | 32 | C |
| | 2 | X-2 | (C-2) | B | 15.8 | A |
| | 3 | X-3 | (C-3) | A | 15 | A |
| | 4 | X-4 | (C-4) | S | 8.9 | S |
| | 5 | X-5 | (C-5) | B | 17.5 | A |
| | 6 | X-6 | (C-6) | A | 18.9 | A |
| | 7 | X-7 | (C-7) | A | 18.9 | A |
| | 8 | X-8 | (C-8) | A | 18.9 | A |
| | 9 | X-9 | (C-9) | B | 17.5 | A |
| | 10 | X-10 | (C-10) | A | 18.9 | A |
| | 11 | X-11 | (C-11) | B | 17.5 | A |
| | 12 | X-12 | (C-12) | A | 18.9 | A |
| | 13 | X-13 | (C-13) | A | 18.9 | A |
| Compar- ative Example | 1 | X-14 | (C-14) | D | — | — |
| | 2 | X-15 | (C-15) | D | — | — |
| | 3 | X-16 | (C-16) | D | — | — |
| | 4 | X-17 | No | D | — | — |

TABLE 3

| Example/ Comparative Example | | Thermosetting coating composition | Amine compound | Water resistance |
|---|---|---|---|---|
| Example | 14 | Y-1 | (C-1) | C |
| | 15 | Y-2 | (C-2) | C |
| | 16 | Y-3 | (C-3) | C |
| | 17 | Y-4 | (C-4) | B |
| | 18 | Y-5 | (C-5) | B |
| | 19 | Y-6 | (C-6) | B |
| | 20 | Y-7 | (C-7) | A |
| | 21 | Y-8 | (C-8) | S |
| | 22 | Y-9 | (C-9) | B |
| | 23 | Y-10 | (C-10) | B |

TABLE 3-continued

| Example/ Comparative Example | | Thermosetting coating composition | Amine compound | Water resistance |
|---|---|---|---|---|
| | 24 | Y-11 | (C-11) | A |
| | 25 | Y-12 | (C-12) | A |
| | 26 | Y-13 | (C-13) | S |
| Comparative Example | 5 | Y-14 | (C-14) | C |
| | 6 | Y-15 | (C-15) | C |
| | 7 | Y-16 | (C-16) | C |
| | 8 | Y-17 | No | D |

Evaluation Test
<Curability (Gel Fraction)>

A glass plate was coated with the thermosetting coating composition of Examples 1 to 13 or Comparative Examples 1 to 4 by using an applicator so as to form a film to be cured having a thickness of about 30 μm on the glass plate, followed by heat-curing at 140° C. for 30 minutes, and the obtained coating film was peeled off from the glass plate. Next, the coating film was placed in a wire mesh, then the wire mesh with the coating film was placed in a separate-type round bottom flask, 100 g of acetone was added to the flask with respect to 1 g of the coating film, and the mixture was refluxed for five hours. The taken-out coating film was dried at 105° C. for one hour, the weight of the coating film was measured, and the gel fraction was calculated by the following equation.

Gel fraction (%)=weight of coating film after reflux/ weight of coating film before reflux×100

The evaluation was performed based on the following criteria. S to C represent successful results, and D represents failed results.

S: The gel fraction is 95% or more, and the curability is excellent.

A: The gel fraction is 90% or more and less than 95%, and the curability is very good.

B: The gel fraction is 80% or more and less than 90%, and the curability is good.

C: The gel fraction is 70% or more and less than 80%, and the curability is fair.

D: The gel fraction is less than 70%, and the curability is poor.

<Flatness (Dihedral Angle)>

The dihedral angle α of the amine compounds (C-1) to (C-13) having the structure of the following formula(s) (6) and/or (7) was determined by the structure optimization calculation based on the density functional theory calculation B3LYP/6-31G * using Gaussian03 (produced by Gaussian, Inc.) and the following equation(s) (A) and/or (B).

In a case where the amine compound has two or more kinds of the following structures (formula (6) and/or formula (7)) in the molecule (e.g., amine compounds (C-4) and (C-9) to (C-13)), the smaller value was set as the dihedral angle of the amine compound.

[Chem. 20]

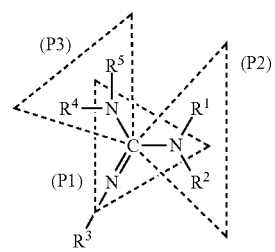

(6)

[Chem. 21]

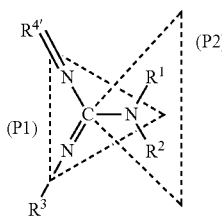

(7)

Dihedral Angle α=[(dihedral angle between P1 and P2)+(dihedral angle between P1 and P3)]/2  (A)

Dihedral Angle α=dihedral angle between P1 and P2  (B)

The dihedral angles (degrees) and evaluation criteria of the flatness indicated by S to C are described in Table 2.

S: The dihedral angle is less than 15 degrees, and the flatness is excellent.

A: The dihedral angle is 15 degrees or more and less than 20 degrees, and the flatness is good.

B: The dihedral angle is 20 degrees or more and less than 30 degrees, and the flatness is fair.

C: The dihedral angle is 30 degrees or more, and the flatness is poor.

<Water Resistance (Gloss Retention)>

A cold rolled steel sheet (size: 400×300×0.8 mm) treated with "Palbond #3020" (produced by Nihon Parkerizing Co., Ltd., zinc phosphate treatment) was coated with "Elekron GT-10" (produced by Kansai Paint Co., Ltd., a thermosetting epoxy resin based cationic electrodeposition coating composition) in an electrodeposition manner to form a coating film having a thickness of 20 μm, and the coating film was heat-cured at 170° C. for 30 minutes. The coating film was coated with "TP-65" (produced by Kansai Paint Co., Ltd., trade name, a polyester-melamine resin based coating composition for automobile) in an air spray manner to form a drying film having a thickness of 35 μm, and the drying film was heat-cured at 140° C. for 30 minutes.

Next, the drying film was separately coated with thermosetting coating compositions of Examples 14 to 26 or Comparative Examples 5 to 8 by using an applicator so as to form a cured coating film having a thickness of about 20 μm, and the cured coating film was heat-cured at 140° C. for 30 minutes.

The obtained test plate was immersed in pure water and allowed to stand at 40° C. for 240 hours, and the glossiness after immersion was measured and the gloss retention was determined.

The gloss retention is calculated using the following equation, based on the value obtained by measuring the specular gloss degree of the surface (test surface) at an incident angle of 60 degrees by the method in accordance with JIS Z 8741-1997.

Gloss retention (%)=(gloss degree after water resistance test/initial gloss degree)×100

The evaluation was performed based on the following criteria. S to C represent successful results, and D represents failed results.

S: The gloss retention is 95% or more, and the water resistance is excellent.

A: The gloss retention is 90% or more and less than 95%, and the water resistance is very good.

B: The gloss retention is 80% or more and less than 90%, and the water resistance is good.

C: The gloss retention is 70% or more and less than 80%, and the water resistance is fair.

D: The gloss retention is lower than 70%, and the water resistance is poor.

Although the present invention is described in detail with reference to specific embodiments, it is apparent to those skilled in the art that various changes and modifications can be made without departing from the spirit and scope of the present invention. The present application is based on Japanese Patent Application No. 2016-228374 filed on Nov. 24, 2016, the contents of which are incorporated herein by reference.

The invention claimed is:

1. A thermosetting coating composition, comprising a hydroxyl group-containing resin (A), a blocked polyisocyanate curing agent (B), and an amine compound (C) represented by the following formula (1):

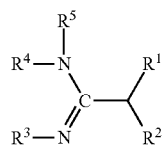

(1)

wherein $R^1$ to $R^5$ each independently represents a hydrogen atom or an organic group having one or more carbon atoms, and the organic group optionally contains one or more atoms selected from the group consisting of oxygen atoms, nitrogen atoms, sulfur atoms, and halogen atoms, and at least one of $R^1$ to $R^5$ has a number average molecular weight of 300 or more.

2. The thermosetting coating composition according to claim 1, wherein the amine compound (C) is an amine compound represented by the following formula (2):

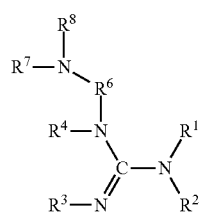

(2)

wherein $R^1$ to $R^4$ and $R^7$ and $R^8$ each independently represents a hydrogen atom or an organic group having one or more carbon atoms, and the organic group optionally contains one or more atoms selected from the group consisting of oxygen atoms, nitrogen atoms, sulfur atoms and halogen atoms; and $R^6$ is a bifunctional organic group having one or more carbon atoms, and the bifunctional organic group optionally contains one or more atoms selected from the group consisting of oxygen atoms, nitrogen atoms, sulfur atoms and halogen atoms, and at least one of $R^1$ to $R^4$ and $R^6$ to $R^8$ has a number average molecular weight of 300 or more.

3. The thermosetting coating composition according to claim 2, wherein in the amine compounds (C) represented by the above formula (2), $R^7$ has a number average molecular weight of 300 or more.

4. The thermosetting coating composition according to claim 1, wherein the amine compound (C) is an amine compound represented by the following formula (3):

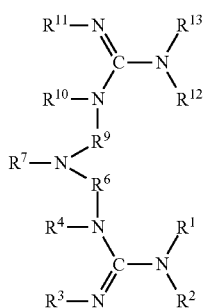

(3)

wherein $R^1$ to $R^4$, $R^7$, and $R^{10}$ to $R^{13}$ each independently represents a hydrogen atom or an organic group having one or more carbon atoms, and the organic group optionally contains one or more atoms selected from the group consisting of oxygen atoms, nitrogen atoms, sulfur atoms and halogen atoms; and $R^6$ and $R^9$ each independently represents a bifunctional organic group having one or more carbon atoms, and the bifunctional organic group optionally contains one or more atoms selected from the group consisting of oxygen atoms, nitrogen atoms, sulfur atoms and halogen atoms, and at least one of $R^1$ to $R^4$, $R^6$, $R^7$, and $R^9$ to $R^{13}$ has a number average molecular weight of 300 or more.

5. The thermosetting coating composition according to claim 1, wherein in the amine compounds (C) represented by the above formula (1), at least one of $R^1$ to $R^5$ independently represents a hydrocarbon group having three or more carbon atoms.

6. The thermosetting coating composition according to claim 5, wherein the hydrocarbon group having three or more carbon atoms is a branched or cyclic hydrocarbon group.

7. The thermosetting coating composition according to claim 1, wherein the amine compound (C) is an amine compound represented by the following formula (4):

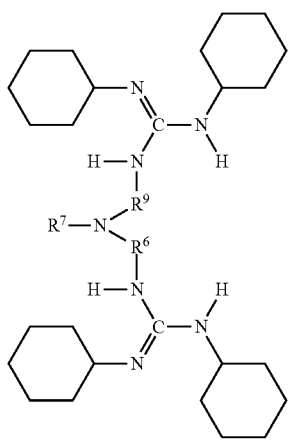

(4)

wherein $R^7$ represents a hydrogen atom or an organic group having one or more carbon atoms, and the organic group optionally contains one or more atoms selected from the group consisting of oxygen atoms, nitrogen atoms, sulfur atoms and halogen atoms; and $R^6$ and $R^9$ each independently represents a bifunctional organic group having one or more carbon atoms, and the bifunctional organic group optionally contains one or more atoms selected from the group consisting of oxygen atoms, nitrogen atoms, sulfur atoms and halogen atoms, and at least one of $R^6$, $R^7$ and $R^9$ has a number average molecular weight of 300 or more.

8. The thermosetting coating composition according to claim 1, wherein in the amine compounds (C) represented by the above formula (1), $R^3$ represents a structure represented by the following formula (5):

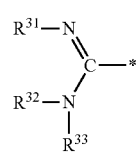

(5)

wherein $R^{31}$ to $R^{33}$ each independently represents a hydrogen atom or an organic group having one or more carbon atoms, and the organic group optionally contains one or more atoms selected from the group consisting of oxygen atoms, nitrogen atoms, sulfur atoms and halogen atoms; and * represents an atomic bonding.

9. The thermosetting coating composition according to claim 1, wherein the amine compound (C) has a structure represented by the following formula (6):

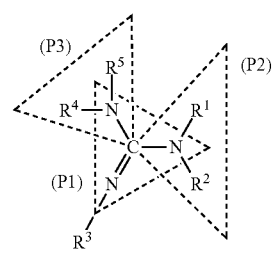

(6)

wherein $R^1$ to $R^5$ each independently represent a hydrogen atom or an organic group having one or more carbon atoms, and the organic group optionally contains one or more atoms selected from the group consisting of oxygen atoms, nitrogen atoms, sulfur atoms, and halogen atoms;

wherein in the formula (6), an average dihedral angle α shown in the following equation (A) obtained by a structural optimization calculation based on a density functional theory calculation B3LYP/6-31G* is 20° or less, wherein in a case where the amine compound has two or more of structures represented by the formula (6) in a molecule thereof, the smaller value is set as the dihedral angle:

Dihedral Angle α=[(dihedral angle between $P1$ and $P2$)+(dihedral angle between $P1$ and $P3$)]/2    (A)

wherein P1 is a plane containing three N atoms, P2 is a plane containing $C(R^1)(R^2)$, and P3 is a plane containing $C(R^4)(R^5)$.

10. A coated article obtained by applying the thermosetting coating composition according to claim 1 to an object to be coated.

* * * * *